(12) United States Patent
Bohm et al.

(10) Patent No.: US 9,491,495 B2
(45) Date of Patent: Nov. 8, 2016

(54) METHOD AND APPARATUS FOR PROVIDING INPUT TO A CAMERA SERIAL INTERFACE TRANSMITTER

(71) Applicant: ANALOG DEVICES GLOBAL, Hamilton (BM)

(72) Inventors: Chris W. Bohm, Rattenberg (DE); Narsimh Dilip Kamath, Bangalore (IN)

(73) Assignee: Analog Devices Global, Hamilton (BM)

( * ) Notice: Subject to any disclaimer, the term of this patent is extended or adjusted under 35 U.S.C. 154(b) by 118 days.

(21) Appl. No.: 14/598,299

(22) Filed: Jan. 16, 2015

(65) Prior Publication Data

US 2016/0212456 A1 Jul. 21, 2016

(51) Int. Cl.
*H04L 25/49* (2006.01)
*H04N 21/236* (2011.01)
*H04N 21/414* (2011.01)
(Continued)

(52) U.S. Cl.
CPC ......... *H04N 21/23602* (2013.01); *B60R 11/04* (2013.01); *H04H 20/62* (2013.01); *H04L 25/493* (2013.01); *H04L 25/4904* (2013.01); *H04N 21/2365* (2013.01); *H04N 21/23406* (2013.01); *H04N 21/41422* (2013.01); *H04N 21/4223* (2013.01); *H04L 1/0057* (2013.01)

(58) Field of Classification Search
CPC ............. H04L 1/0057; H04L 25/4904; H04L 25/493; H04L 29/06027; H04L 65/607; H04N 5/332; H04N 21/2365; H04N 21/42615; H04N 21/4347; G11C 7/1006
See application file for complete search history.

(56) References Cited

U.S. PATENT DOCUMENTS 4,445,137 A * 4/1984 Panofsky ............. G06T 1/0014
382/302
5,583,561 A * 12/1996 Baker ................ H04N 7/17336
348/E7.073

(Continued)

FOREIGN PATENT DOCUMENTS

DE 10-2009-051265 7/2010
KR 10-2011-0062326 6/2011
KR 10-2011-0078164 7/2011

OTHER PUBLICATIONS

Kajetan Feichtenschlager et al., "Analysis of Multimedia Networks for Automotive Applications", Technical Report, IDE0709, Jan. 2007, School of Information Science, Computer and Electrical Engineering, IDS, Halmstad University, Halmstad, Sweden, 80 pages.

(Continued)

*Primary Examiner* — Raj Jain
(74) *Attorney, Agent, or Firm* — Patent Capital Group

(57) ABSTRACT

A system for receiving at least two data streams and providing a single input data stream to a MIPI's CSI Tx is disclosed. The two received data streams are written into respective data buffers. The system includes a control logic configured to control reading of data stored in the buffers to a multiplexer, the read-side clock being a multiple of a frequency of a fixed frequency clock. The control logic is further configured to control the multiplexer to combine data read from each buffer that corresponds to a complete unit of data into a separate portion and multiplex the separate portions into the input data stream. In this manner, two data streams may be transmitted using a single CSI Tx. When the two data streams are received by the system from an APIX interface, the system provides a bridge between the APIX interface and MIPI's CSI Tx.

20 Claims, 7 Drawing Sheets

(51) Int. Cl.
*B60R 11/04* (2006.01)
*H04H 20/62* (2008.01)
*H04N 21/4223* (2011.01)
*H04N 21/2365* (2011.01)
*H04N 21/234* (2011.01)
*H04L 25/493* (2006.01)
*H04L 1/00* (2006.01)

(56) References Cited

U.S. PATENT DOCUMENTS

| | | | | |
|---|---|---|---|---|
| 5,812,704 | A * | 9/1998 | Pearson | H04N 1/193 382/282 |
| 7,881,320 | B1 * | 2/2011 | Schumacher | H04N 21/226 370/383 |
| 8,896,699 | B2 | 11/2014 | Kasuga et al. | |
| 2004/0218099 | A1 * | 11/2004 | Washington | H04N 5/77 348/571 |
| 2008/0037693 | A1 * | 2/2008 | Andrus | H04L 1/0057 375/359 |
| 2011/0242356 | A1 | 10/2011 | Aleksic et al. | |
| 2014/0146195 | A1 * | 5/2014 | Ju | G06F 1/3278 348/222.1 |
| 2015/0281598 | A1 * | 10/2015 | Southerland | G01J 5/025 348/164 |

OTHER PUBLICATIONS

"Hybrid Cluster and Infotainment Use Common System Architecture", Springer Link, ATZelektronik worldwide eMagazine, Aug. 2011, vol. 6, Issue 4, pp. 40-43, Date: Aug. 11, 2011, 3 pages.

"Mobile Pixel Link Level-0", Version 0.9, © 2004 National Semiconductor Corporation, 24 pages.

Preliminary Data Sheet—"Digital Automotive Pixel Link", Inova® Semiconductors, APIX® (Automotive Pixel Link), Arp. 12, 2006, Rev. 0.9, PD_APIX_INAP125, 22 pages.

Juergen Lang et al., "OEM Value Chain Collaboration Introducing a New Standard for In-Vehicle Display Systems", © 2010 SAE International, 2010-01-2343, Published Oct. 19, 2010, ISSN: 0148-7191, doi: 10.4271/2010-01-2343, 5 pages.

English Translation of German Patent Application Publication Serial No. 10-2009-051265 dated Jul. 1, 2010, 9 pages.

English Translation of Korean Patent Application Publication Serial No. 10-2011-0062326 dated Jun. 10, 2011, 6 pages.

English Translation of Korean Patent Application Publication Serial No. 10-2011-0078164 dated Jul. 7, 2011, 8 pages.

* cited by examiner

METHOD AND APPARATUS FOR PROVIDING INPUT TO A CAMERA SERIAL INTERFACE TRANSMITTER

TECHNICAL FIELD OF THE DISCLOSURE

The present invention relates to the transmission of audio and video streams over serial transports, in particular to systems and methods for providing an input data stream to a transmitter of a Camera Serial Interface (CSI Tx), such as e.g. CSI-2 Tx.

BACKGROUND

The distribution of audio and video ("AV") content in motor vehicles is a fast growing market. The manufacturing of modern motor vehicles has included such features as automotive infotainment systems which can display high-definition formats in a screen (panel) located e.g. in a Head-Unit ("HU") of a vehicle.

An infotainment system of a vehicle typically combines data from multiple sources before displaying the data to vehicle occupant(s). One common example of such multiple sources includes stereo rearview cameras of a vehicle generating their respective video streams. An external device such as a smartphone or a tablet computer connected to an infotainment system of a vehicle is another common example of a data source. Such an external device could be connected to the vehicle's infotainment system via a User Interface Panel ("UIP") acting as a console for connecting various external (user) devices, thereby e.g. allowing a user to connect a smartphone in order to view video or other graphics on the screen in the HU. The UIP might also act as a console where video streams from the stereo rearview cameras may come in.

Data streams from different sources are combined by an applications processor, residing e.g. in the HU of a vehicle. The applications processor could further perform additional operations such as e.g. adding a layer of graphics on top of an input video stream, etc., following which, it would display the resulting video stream on the screen (panel) of the vehicle's infotainment system.

Applications processors used in recent automotive infotainment systems use Camera Serial Interface ("CSI") of Mobile Industry Processor Interface ("MIPI") alliance to receive data streams from camera subsystems. CSI is a serial link for high-speed transfer of data, particularly suitable for video data, over short distances with low power and low electromagnetic interference ("EMI"). The CSI includes a transmitter ("CSI Tx"). Embodiments of the present invention relate to methods and systems for providing input to a CSI Tx, in particular to a CSI Tx as defined in version CSI-2 of MIPI.

OVERVIEW

One aspect of the present invention provides a system for providing an input data stream to a transmitter of a Camera Serial Interface (CSI Tx), in particular CSI-2 Tx. The input data stream comprises data of at least a first data stream and a second data stream. The data streams also referred to herein as "channels" and the teachings provided herein can be extended to any N data streams, N being an integer greater than two. The first data stream comprises data organized in first units of data (e.g. lines, each line comprising a specific amount of pixels, if the first data stream is a video stream). The second data stream comprises data organized in second units of data (which could be the same or different than the first units). The data of the first data stream is to be written into a first data buffer, while the data of the second data stream is to be written into a second data buffer. In other words, there is a one to one correspondence between N data streams and N data buffers where each data stream of the N data streams is associated with a different one of the N data buffers. The system includes a multiplexer and a control logic communicatively connected to the multiplexer. The control logic is configured to issue a first read-enable signal for the first buffer to transfer at least a part of the data (the part of the data being identified by the first read-enable signal) stored in (by being written to) the first buffer to the multiplexer at a predefined multiple of a frequency of a fixed frequency clock and issue a second read-enable signal for the second buffer to transfer at least a part of the data (the part of the data being identified by the second read-enable signal) stored in the second buffer to the multiplexer at the predefined multiple of the frequency of the fixed frequency clock. The control logic is further configured to control (i.e., provide appropriate instructions to) the multiplexer to combine all data transferred from the first buffer and corresponding to a complete unit of the first units of data of the first data stream into a first portion, combine all data transferred from the second buffer and corresponding to a complete unit of the second units of data of the second data stream into a second portion, and multiplex the first portion and the second portion into the input data stream. The control logic is further configured to provide (or enable such a provision) the input data stream to the CSI Tx.

In an embodiment which could be additional or alternative to the embodiment described above, the control logic may further be configured to control the CSI Tx to enter a high-speed (HS) mode to transmit the first portion in a first packet and to control the CSI Tx to enter the HS mode to transmit the second portion in a second packet, the first packet assigned a virtual channel number corresponding to the first data stream and the second packet assigned a virtual channel number corresponding to the second data stream, wherein between transmitting the first packet and the second packet the CSI Tx is configured to enter a low-power (LP) mode. Such an embodiment advantageously enables operation of the CSI Tx in accordance with the specification of the MIPI alliance, while allowing the control logic of an external system to control the operation of the CSI Tx.

In an embodiment which could be additional or alternative to any of the embodiments above, each of the first and second data streams may be received by the system and written into a respective buffer in an interleaved and interrupted manner as pixel data transported by an Automotive Pixel Link (APIX) interface. In such an embodiment, the first and second data streams may comprise video streams, where each unit of the first units of data comprises a complete line comprising a first predefined number of pixels and each unit of the second units of data comprises a complete line comprising a second predefined number of pixels. The control logic may be communicatively connected to the APIX interface and further configured to receive indications from the APIX interface when each complete line of each of the first and second video streams begins and ends. The control logic may further configured be to control the CSI Tx to enter the HS mode to transmit each complete line of each of the first and second video streams in a separate packet, where between transmitting the separate packets containing a complete line of a respective video stream the CSI Tx is configured to enter a LP mode. Such an embodiment provides a bridge for transmitting data transported by the APIX interface from the CSI Tx.

In one further embodiment, the indications received from the APIX interface comprise horizontal sync signals for the each of the first and second video streams.

In an embodiment which could be additional or alternative to any of the embodiments above, the control logic may further be configured to provide to the CSI Tx an unique identification of the complete unit of the first units of data (e.g. a line number and, possibly, a frame number to which the line belongs) included in the first portion and an indication that the first portion contains data of the first data stream. Similarly, the control logic may further be configured to provide to the CSI Tx a unique identification of the complete unit of the second units of data included in the second portion and an indication that the second portion contains data of the second data stream. Such an embodiment allows the control logic to provide to the CSI Tx an indication that a data in a particular multiplexed portion corresponds e.g. to a particular line number of a particular frame of a particular channel. As a result, the CSI Tx is able to insert a proper virtual channel number into a packet to be transmitted that will contain the data of this multiplexed portion.

In an embodiment which could be additional or alternative to any of the embodiments above, the first and second data streams could comprise video stream, each first unit of data could comprise a complete line comprising a first predefined number of pixels, and each second unit could comprise a complete line comprising a second predefined number of pixels, and the system could include the first and second buffers. In such an embodiment, the first buffer may comprise a line buffer for storing at least a portion of the complete line comprising the first predefined number of pixels and the second buffer comprises a line buffer for storing at least a portion of the complete line comprising the second predefined number of pixels. For example, such a line buffer could comprise a memory having a 0.5 or a 1.5 line depth (i.e., a memory capable of storing 0.5 or 1.5 times the maximum number of pixels in an active video line of a video frame). The width of the memory could correspond to the maximum bit-width of each pixel.

In various embodiments, the system as described herein may be implemented in an application specific integrated circuit ("ASIC"), and/or at least a part of the system may be implemented in a programmable hardware, e.g. as a field programmable gate array ("FPGA").

In embodiment, the system described herein may include memory that further comprises machine-readable instructions that when executed cause the system to perform any of the activities discussed above.

In an embodiment, any one of the first and second buffers, the multiplexer, and the control logic described above could comprise any means suitable for performing the respective functions of these functional components. The 'means for' in these instances can include, but are not limited to, using any suitable component discussed herein, along with any suitable software, circuitry, hub, computer code, logic, algorithms, hardware, controller, interface, link, bus, communication pathway, etc.

Another aspect of the present invention provides a method implemented by the control logic according to various embodiments described above.

Other aspects relate to computer programs and computer-readable storage medium, preferably non-transitory, comprising instructions for carrying out methods described herein.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Exemplary Setting for Implementing Embodiments of the Present Invention

Figure 1:
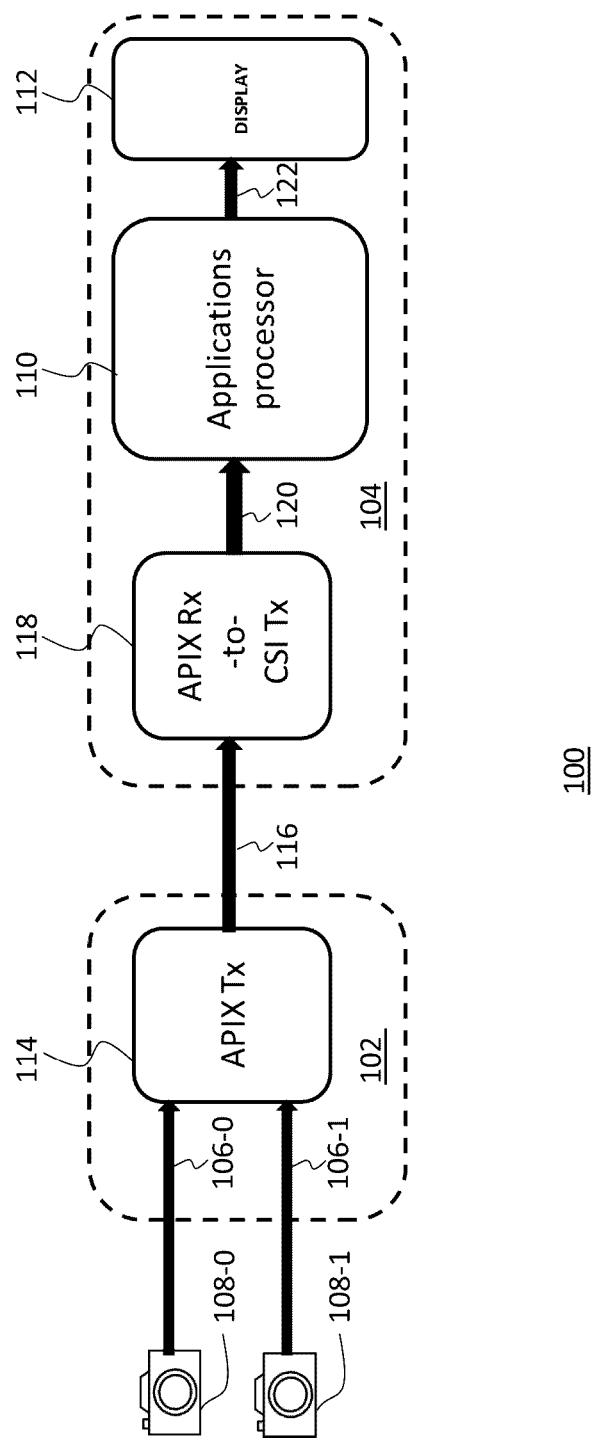
FIG. 1 is a diagram illustrating transport of data from a UIP to a HU of a vehicle, according to an embodiment of the present invention.

Embodiments of the present invention may be particularly useful for transporting data, especially video data, from a UIP to a HU in a vehicle. One such setting for implementing embodiments of the present invention is shown in FIG. 1, illustrating an infotainment system 100. As shown in FIG. 1, the system 100 comprises a UIP 102 and a HU 104, the UIP 102 acting as a console where video streams 106-0 and 106-1 from two stereo rearview cameras 108-0 and 108-1, respectively, come in. These video streams from different sources would need to be transported to an applications processor 110 residing inside the HU 104. As described above, the applications processor 110 could perform one of several operations such as combining the video streams from the stereo rear-view cameras or adding a layer of graphics on top of an input video stream, etc., following which, the applications display would display the resulting video stream on a display 112, which could be included e.g. in a screen (panel) in the HU 104.

In the particular exemplary implementation shown in FIG. 1, the system 100 may employ the APIX® interface for transporting video streams from the UIP to the HU, described in greater detail below. APIX® is a serial link for high-speed transfer of audio/video/control data over long distances with low EMI. An APIX transmitter ("APIX TX") 114 may be included in the UIP 102 and be configured for transporting video data from both sources 108 over a single APIX interface from the UIP 102 to the HU 104, as shown with a data stream 116.

The applications processor 110 is configured to use MIPI's CSI-2 to receive the video streams from the cameras 108. To that end, embodiments of the present invention provide a system 118, described in greater detail below, which could act as a bridge between the APIX and CSI interfaces, preferably implemented as an Applications Specific Integrated Circuit ("ASIC"). Embodiments of the present invention aim to reduce the pin-count of this ASIC and enable transfer of video to the applications processor 110 on a clock derived from a fixed frequency clock, thereby resulting in more efficient and lower cost system design due to lower pin-count (i.e., fewer printed circuit board traces) and easier implementation of EMI reduction circuitry. By implementing the system 118, the applications processor 110 would receive the video data from both sources as a single data stream 120 and, based on the data stream 120, generate a signal 122 for rendering content on the display 112.

Basics of APIX Transport of Data Streams

Figure 2:
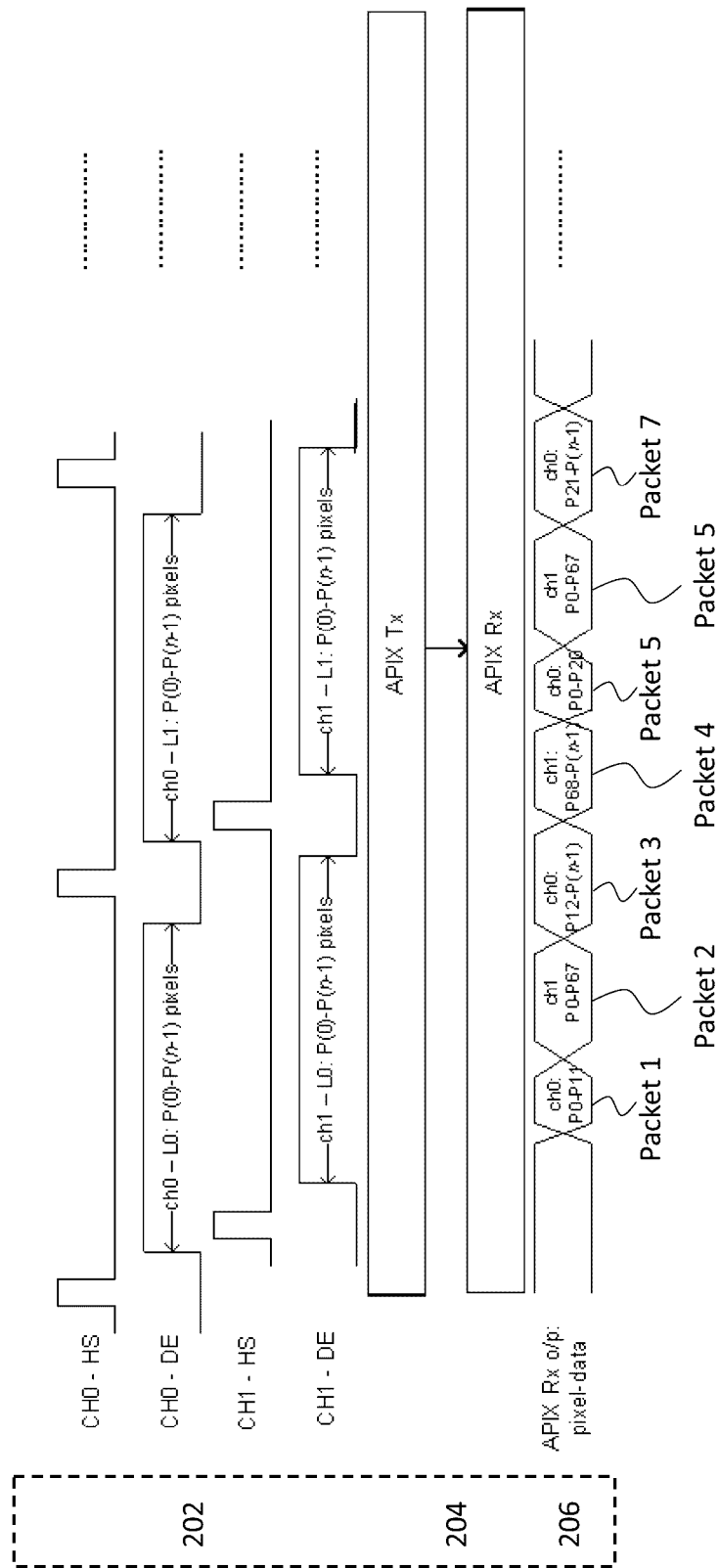
FIG. 2 is a diagram illustrating transport of two video data streams through the APIX® interface.

FIG. 2 is a diagram illustrating transport of two video data streams using the APIX® interface. In general, the APIX® interface may transport audio, video (up to two streams of each) and control data. The illustration of FIG. 2 is applicable to transporting the video streams 106-0 and 106-1 from the UIP 102 to the HU 104.

Step 202 of FIG. 2 illustrates the synchronization signals Horizontal Sync ("HS") and Data Enable ("DE") for the two sources of video data, the two sources designated as channels ("CH") 0 and 1. As is well-known, DE signals indicate portions of video data that comprise active video, i.e., the actual content that is meant to be displayed on a screen, while the HS signals are periodic signals occurring on every video line and indicating that transmission of data corresponding to one line has ended and transmission of data corresponding to another line begins. FIG. 2 illustrates a HS signal for CH 0 as "CH0-HS" and a DE signal for CH0 as "CH0-DE", where, after the first occurrence of a non-zero signal CH0-HS, the n pixels (pixels P(0)-P(n−1)) of line 0 from the data source 0 (e.g. the camera 108-0) are transmitted, and after the second occurrence of a non-zero signal CH0-HS, the n pixels P(0)-P(n−1) of line 1 from the data source 0 are transmitted. Similarly, FIG. 2 illustrates a HS signal for CH 1 as "CH1-HS" and a DE signal for CH1 as "CH1-DE", where, after the first occurrence of a non-zero signal CH1-HS, the n pixels (pixels P(0)-P(n−1)) of line 0 from the data source 1 (e.g. the camera 108-1) are transmitted, and after the second occurrence of a non-zero signal CH1-HS, the n pixels P(0)-P(n−1) of line 1 from the data source 1 are transmitted.

Step 204 of FIG. 2 illustrates the signals of step 202 being provided from the data sources to the transmitter of the APIX® interface (e.g. the APIX Tx 114 shown in FIG. 1) and the transmitter of the APIX® interface transporting the signals to the receiver of the APIX® interface ("APIX Rx"). With reference to FIG. 1, such data sources would be the cameras 108-0 and 108-1, the transmitter of the APIX® interface would be the APIX Tx 114 of FIG. 1, and, while the APIX Rx is not shown individually in FIG. 1, a skilled person would readily recognize that the APIX Rx would be receiving the signal 116 and providing it to the system 118.

According to APIX specification, the APIX® interface transports active data, such as e.g. audio, video (up to two streams of each), in the form of packets, and control data, where the active data is transmitted in an interrupted (i.e., burst-mode) and interleaved manner and the exact order of transmission of packets corresponding to these different components could be random. As a result, the pixel data of the APIX Rx could appear as shown in step 206 of FIG. 2, illustrating that Packet 1 of the output signal of the APIX Rx comprises a first part of the n pixels of line 0 of CH0 (shown as in FIG. 2 as pixels "CH0:P(0)-P(11)"), Packet 2 comprises a first part of the n pixels of line 0 of CH1 (shown as in FIG. 2 as pixels "CH1:P(0)-P(67)"), Packet 3 comprises the remaining pixels of line 0 of CH0 (shown as in FIG. 2 as pixels "CH0:P(12)-P(n−1)"), Packet 4 comprises the remaining pixels of line 0 of CH1 (shown as in FIG. 2 as pixels "CH1:P(68)-P(n−1)"), Packet 5 comprises a first part of the n pixels of line 1 of CH0 (shown as in FIG. 2 as pixels "CH0:P(0)-P(20)"), Packet 6 comprises a first part of the n pixels of line 1 of CH1 (shown as in FIG. 2 as pixels "CH1:P(0)-P(67)"), Packet 7 comprises the remaining pixels of line 1 of CH0 (shown as in FIG. 2 as pixels "CH0:P(21)-P(n−1)"), and so on.

The output of step 206 is then clocked on an APIX® system clock, which is a fixed frequency clock of 187.5 megahertz ("MHz"). The APIX® Rx also has an option of generating streaming video data on a re-generated pixel clock, however neither the system clock nor the re-generated pixel clock are of sufficiently good quality to drive a phase locked loop ("PLL") in order to generate the MIPI CSI Tx output clock.

Basics of CSI-2 Transport of Data Streams

According to the specification provided by the MIPI alliance, CSI interface can transport up to four video streams on a single streaming clock. The CSI Tx encodes these video streams into CSI packets having a different "Virtual Channel Number" for different video streams and serializes the same to be transmitted on up to four data lanes accompanied by one clock lane. The serial clock frequency is a function of the input streaming clock and depends on the number of data lanes being used as well as the input video format. A PLL is used by the CSI Tx to generate this serial clock from the input streaming clock. The maximum frequency of such a CSI Tx output serial clock is 500 Mhz, corresponding to a double data rate ("DDR") of 1 Gbps per lane.

Figure 3:
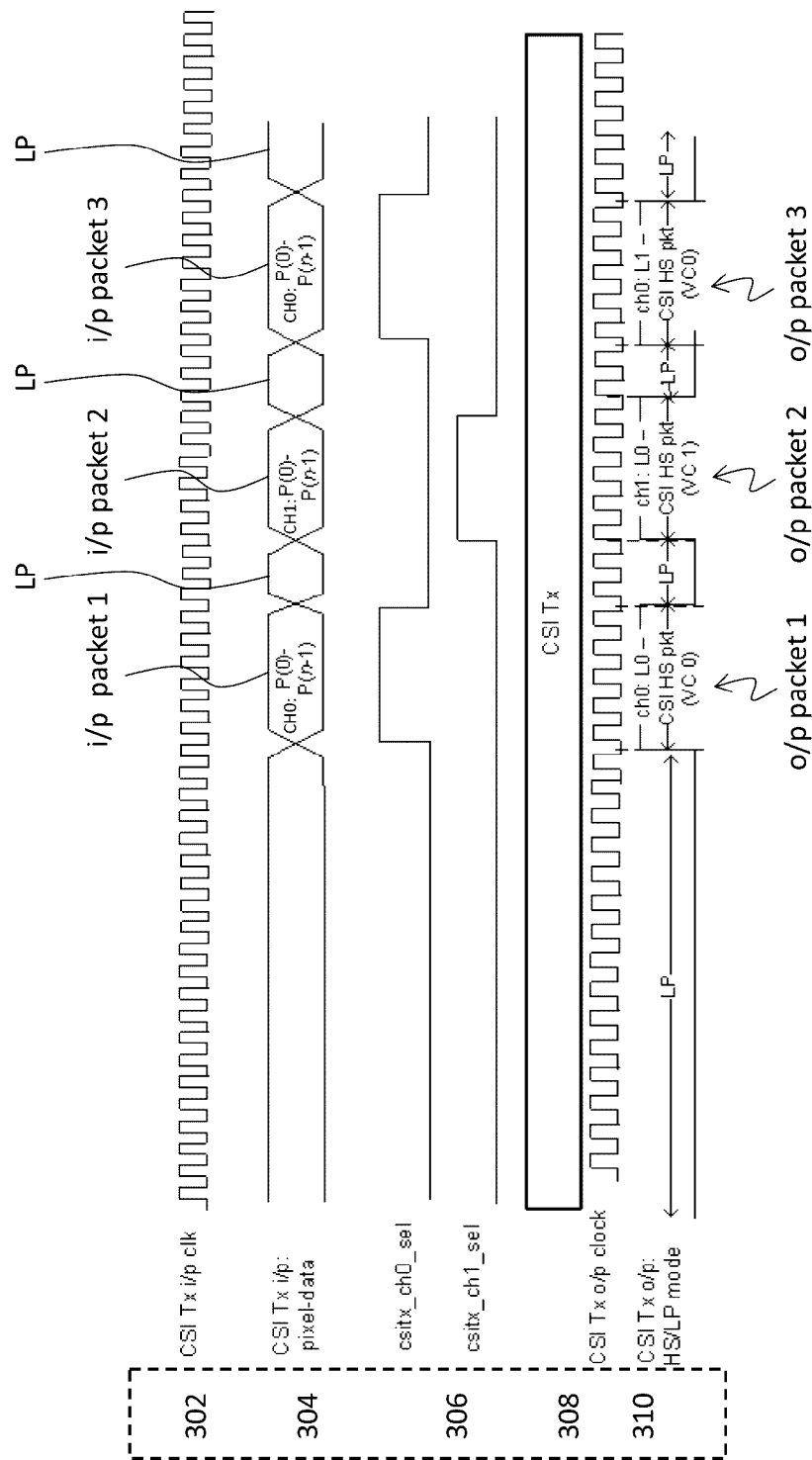
FIG. 3 is a diagram illustrating transport of two video data streams through the MIPI CSI interface.

FIG. 3 is a diagram illustrating transport of two video data streams through the MIPI CSI interface.

Step 302 of FIG. 3 illustrates a CSI Tx input clock, indicated as "CSI Tx i/p clk".

Step 304 of FIG. 3 illustrates the input data for the CSI Tx. According to the specification of the MIPI CSI, the active video data corresponding to an entire line has to be provided as input to CSI Tx in a single packet. In accordance with this specification, step 304 illustrates that active video data comprising pixels P(0)-P(n−1) (i.e., all of the pixels of each line) is provided in separate packets, shown in FIG. 3 with an input ("i/p") packet "i/p packet 1" containing all n pixels of line 0 of CH0, an i/p packet "i/p packet 2" containing all n pixels of line 0 of CH1, an i/p packet "i/p packet 3" containing all n pixels of line 1 of CH0, and so on.

Moreover, the specification of MIPI CSI further provides that CSI has two modes of operation: a High Speed ("HS") mode to transport video data and a Low Power ("LP") mode for transporting system commands or to act as a standby mode when not transporting video data. In accordance with this specification, active video data comprising pixels P(0)-P(n−1) (i.e., all of the pixels of each line) is to be transported by the CSI Tx during the HSP mode, and when there is no active data provided at the input to the CSI Tx, the CSI Tx may enter the LP mode, as explained in greater detail below with reference to steps 306 and 310.

Step 306 of FIG. 3 illustrates "channel select" signals, shown as "csitx_ch0_sel" and "csitx_ch1_sel" for selecting CH0 and CH1, respectively. These signals are used to indicate the channel number to the CSI Tx. In turn, the CSI Tx uses this information when inserting a "Virtual Channel" number in the packets it will transmit, explained in below with reference to step 310. These signals are also used to indicate to the CSI Tx when active data is provided at the input to the CSI Tx (i.e., the i/p packets shown in step 304), for each video stream, thereby triggering the CSI Tx to enter the HS mode for transmission of active data, as shown in step 310 below.

Step 308 of FIG. 3 illustrates that once data is provided on input to CSI Tx, the CSI Tx transmits that data.

Step 310 of FIG. 3 illustrates the output data of the CSI Tx (indicated as "CSI Tx o/p: HS/LP mode"), clocked at the CSI Tx output clock (indicated as "CSI Tx o/p clock"). The CSI encodes the incoming video data into CSI packets and assigns Virtual Channel ("VC") numbers 0 and 1 for CH0 and CH1, respectively. When triggered by a channel select signal and for the duration of the channel select signal, such as either one of the signals shown in step 306, the CSI Tx enters its HS mode to transmit packets corresponding to active video data in each line of the different video streams, while, during the time intervals between the transmissions of two such packets (i.e., where there is no channel select signal for any of the channels), the CSI Tx enters the LP mode. Thus, step 310 illustrates that the active data provided in the i/p packet 1 is transmitted by the CSI Tx, in the HS mode, in an output ("o/p") packet shown as "o/p packet 1", the active data provided in the i/p packet 2 is transmitted in an o/p packet shown as "o/p packet 2", the active data provided in the i/p packet 3 is transmitted in an o/p packet shown as "o/p packet 3", and so on. The CSI Tx assigns the o/p packets VC numbers in accordance with the channel select signal provided to the CSI Tx. Thus, when the channel select signal for CH0 is non-zero, the CSI Tx assigns VC number 0 to the o/p packet transmitted, while when the channel select signal for CH1 is non-zero, the CSI Tx assigns VC number 1 to the o/p packet transmitted, as can be seen by comparing the signals of steps 306 and 310 of FIG. 3.

As the foregoing description illustrates, according to the specification of the MIPI CSI, the active video data corresponding to an entire line of each video stream has to be provided to an input to the CSI Tx in a single packet (as shown e.g. in step 304 of FIG. 3), which is in contrast with the output of the APIX interface where pixel data is included in packets in an interrupted and interleaved manner (as shown e.g. in step 206 of FIG. 2 where pixel data corresponding to a single line is parsed and transmitted in different packets). Therefore, an intermediary is to be used if the data transported by the APIX interface is to be further transported by the MIPI CSI. One of the challenges being dealt with in the embodiments of the present invention is that of interfacing the APIX® Rx with the CSI Tx.

Prior Art Approach of Bridging the APIX and CSI-2 Interfaces

Figure 4:
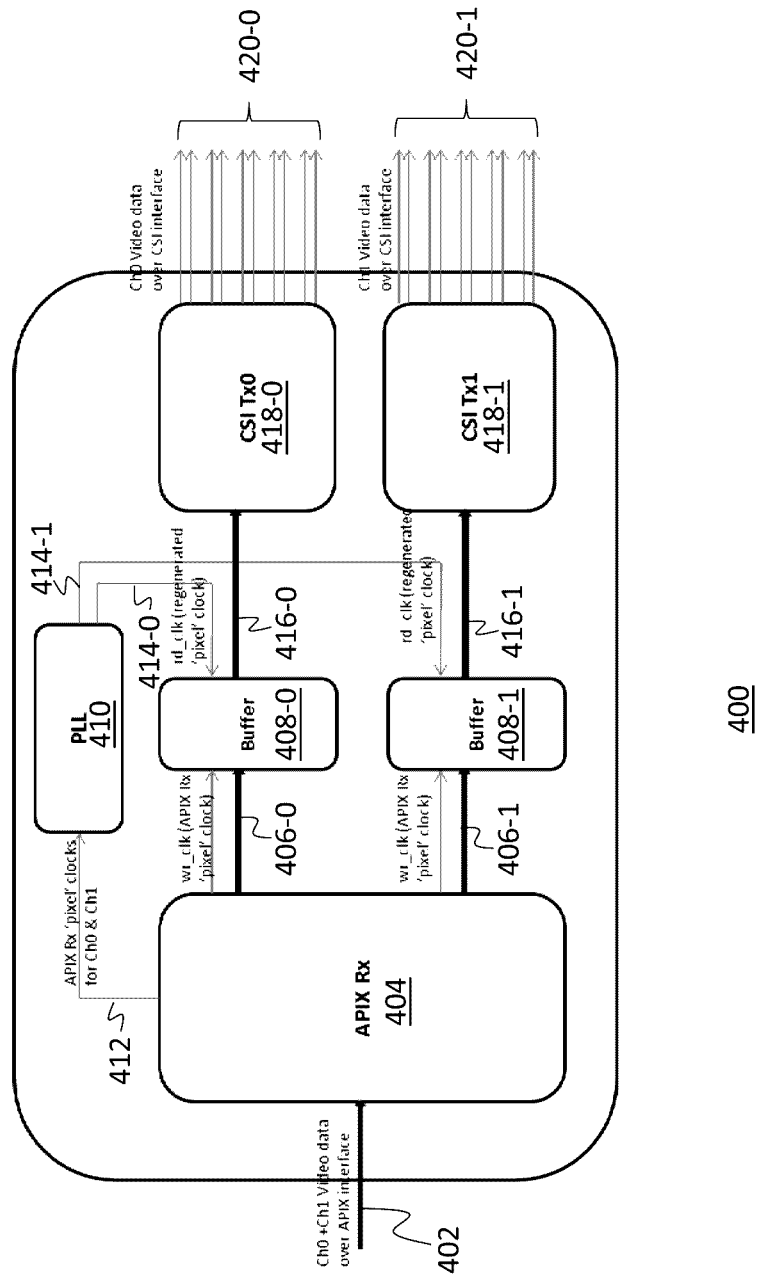
FIG. 4 is a diagram illustrating bridging of the APIX and the CSI interfaces according to prior art.

FIG. 4 is a diagram illustrating bridging of the APIX and the CSI interfaces according to prior art. As shown in FIG. 4, a system 400 receives as an input a signal 402 comprising two video data streams (CH0 and CH1) transported over the APIX interface and received by APIX Rx 404, i.e., the signal 402 is a signal as that shown in step 206 of FIG. 2 where pixel data for various lines of channels 0 and 1 is included in packets in an interrupted and interleaved manner.

The APIX Rx then separates the active data provided for the different channels in signal 402 and provides active pixel data for each channel to its respective buffer, shown in FIG. 4 with a signal 406-0 providing data for CH0 to a buffer 408-0 and a signal 406-1 providing data for CH1 to a buffer 408-1. The input to the buffers 408 is clocked at an APIX Rx pixel clock.

The APIX Rx pixel clocks for both data streams is also provided to a PLL 410, as shown with an arrow 412. The PLL 410 regenerates the respective pixel clocks and provides the regenerated pixel clocks for CH0 and CH1 to the respective buffers 408, shown in FIG. 4 with a regenerated pixel clock 414-0 for CH0 being provided from the PLL 410 to the buffer 408-0 and with a regenerated pixel clock 414-1 for CH1 being provided from the PLL 410 to the buffer 408-1.

The data corresponding to the different channels is then read from the respective buffers 408, at a respective regenerated pixel clock, into a corresponding CSI Tx, shown in FIG. 4 with a read signal 416-0 transferring data, clocked at the regenerated pixel clock 414-0, for CH0 from the buffer 408-0 to a CSI Tx 418-0 and a read signal 416-1 transferring data, clocked at the regenerated pixel clock 414-1, for CH1 from the buffer 408-1 to a CSI Tx 418-1. After that, the CSI Tx 418-0 transports video data for CH0, while the CSI Tx 418-1 transports video data for CH1, over the CSI interface, shown in FIG. 4 with four video streams 420-0 for CH0 and four video streams 420-1 for CH1.

Figure 5:
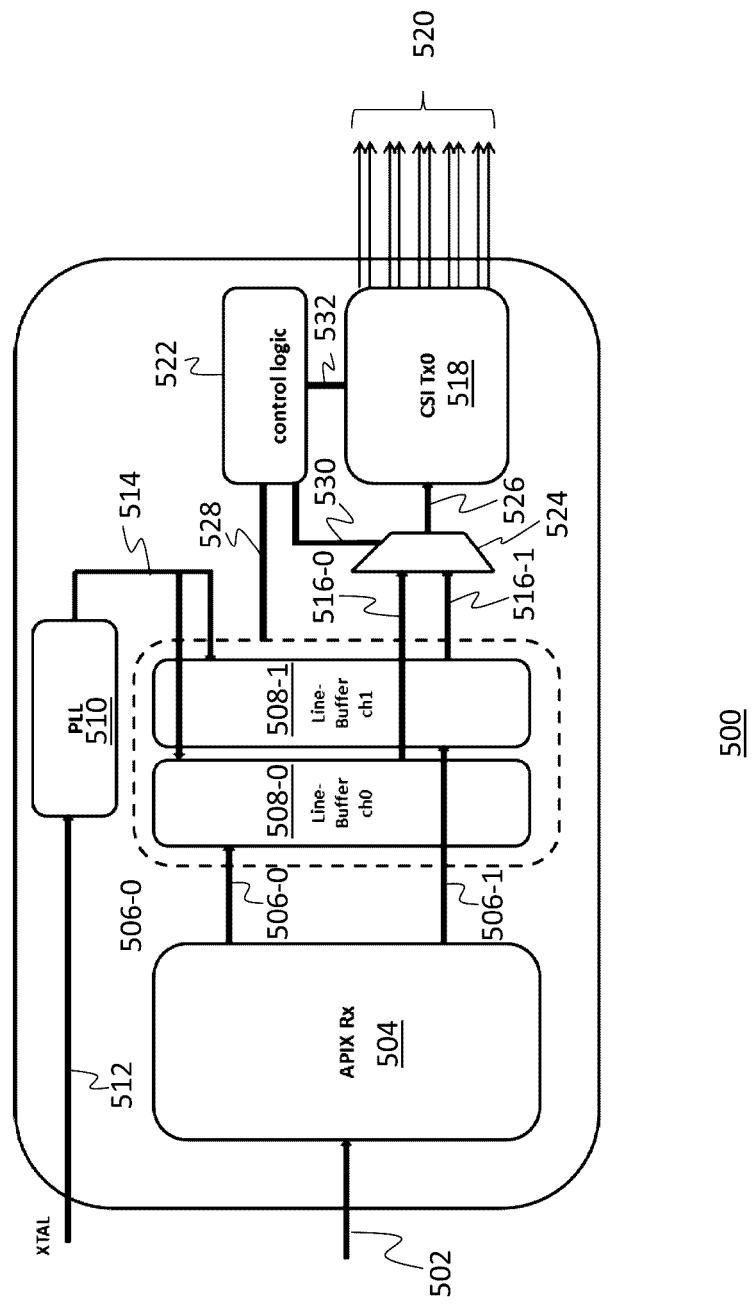
FIG. 5 is a diagram illustrating bridging of the APIX and the CSI interfaces according to an embodiment of the present invention.

Bridging the APIX and CSI-2 Interfaces According to Embodiments of the Present Invention FIG. 5 is a diagram illustrating bridging of the APIX and the CSI interfaces according to an embodiment of the present invention. As shown in FIG. 5, a system 500 may receive as an input a signal 502 comprising two video data streams (CH0 and CH1) transported over the APIX interface and received by APIX Rx 504. For example, the signal 502 may be a signal as that shown in step 206 of FIG. 2 where pixel data for various lines of channels 0 and 1 is included in packets in an interrupted and interleaved manner.

Similar to the system 400, the APIX Rx 504 then separates the active data provided for the different channels in signal 502 and provides active pixel data for each channel to its respective buffer, shown in FIG. 5 with a signal 506-0 providing data for CH0 to a buffer 508-0 and a signal 506-1 providing data for CH1 to a buffer 508-1. Unlike the implementation shown in FIG. 4, in one embodiment, the input to the buffers 508 may be clocked at an APIX system clock, which, as previously described herein, maybe a fixed frequency clock of 187.5 MHz.

In an embodiment, any one of the buffers 508 could comprise a line buffer (particularly if the active data comprises video data), configured to store at least a portion of a complete line in each of the respective data streams. For example, such a line buffer could comprise a memory having a 0.5, 1.0 or a 1.5 line depth (i.e., a memory capable of storing 0.5, 1.0 or 1.5 times the maximum number of pixels in an active video line). The width of the memory could correspond to the maximum bit-width of each pixel.

Also in contrast to the implementation shown in FIG. 4, instead of using respective re-generated pixel clocks, data is read from both buffers 508 using a fixed frequency clock 512, with could optionally have gone through a PLL 510 to become a fixed frequency clock 514. In an embodiment, the frequency of the fixed frequency clock 512/514 could comprise a multiple of a fixed frequency clock available to the system 500. Such a clock could e.g. comprise an XTAL clock used for some other components within a larger system that contains at least portions of the system 500. In other embodiments, any other kind of a fixed frequency clock could be used, such as e.g. a MEMs clock or an APIX system clock, as long as the frequency of such a clock is suitable for the particular implementation of the APIX-CSI bridging. The frequency of a clock at which the data is to be read from the buffers may be determined based on the minimum frequency requirements derived e.g. from the sum of data rates of the individual data streams (data streams 0 and 1 in the illustration of FIG. 5) and/or the size of the buffers used to store the data of the individual data streams (i.e., the buffers 508-0 and 508-1 in the illustration of FIG. 5). In an embodiment, the frequency of a clock at which the data is to be read from the buffers may be selected so that the read side clock is fast enough to prevent the data-buffers from becoming full (i.e., prevent the buffers from overflow). In an embodiment, the frequency of a clock at which the data is to be read from the buffers may be selected as to prevent the data-buffers from underflow. Furthermore, in an embodiment, the frequency of a clock at which the data is to be read from the buffers may be selected based on EMI considerations (i.e., with the goal of minimizing the EMI) within at least parts of the system 500 and/or a larger system comprising parts of or coupled to the parts of the system 500. In various embodiments, the frequency of the read side clock could be selected by selecting the frequency of the fixed frequency clock itself and/or by selecting the multiple applied to the frequency of the fixed frequency clock.

As described in greater detail below, reading of active data from the buffers 508 is controlled (i.e., triggered, instructed, managed, etc.) by a control logic 522, where the data read from the buffers 508 is transferred to a multiplexer 524, the multiplexer 524, in turn, providing data of both data streams CH0 and CH1 in a single input stream 526 to a CSI Tx 518. To that end, the control logic is communicatively coupled (i.e. configured to communicate with) to the buffers 508, either both at the same time or individually, as illustrated in FIG. 5 with a line 528 between the control logic 522 and the buffers 508.

Figure 6A:
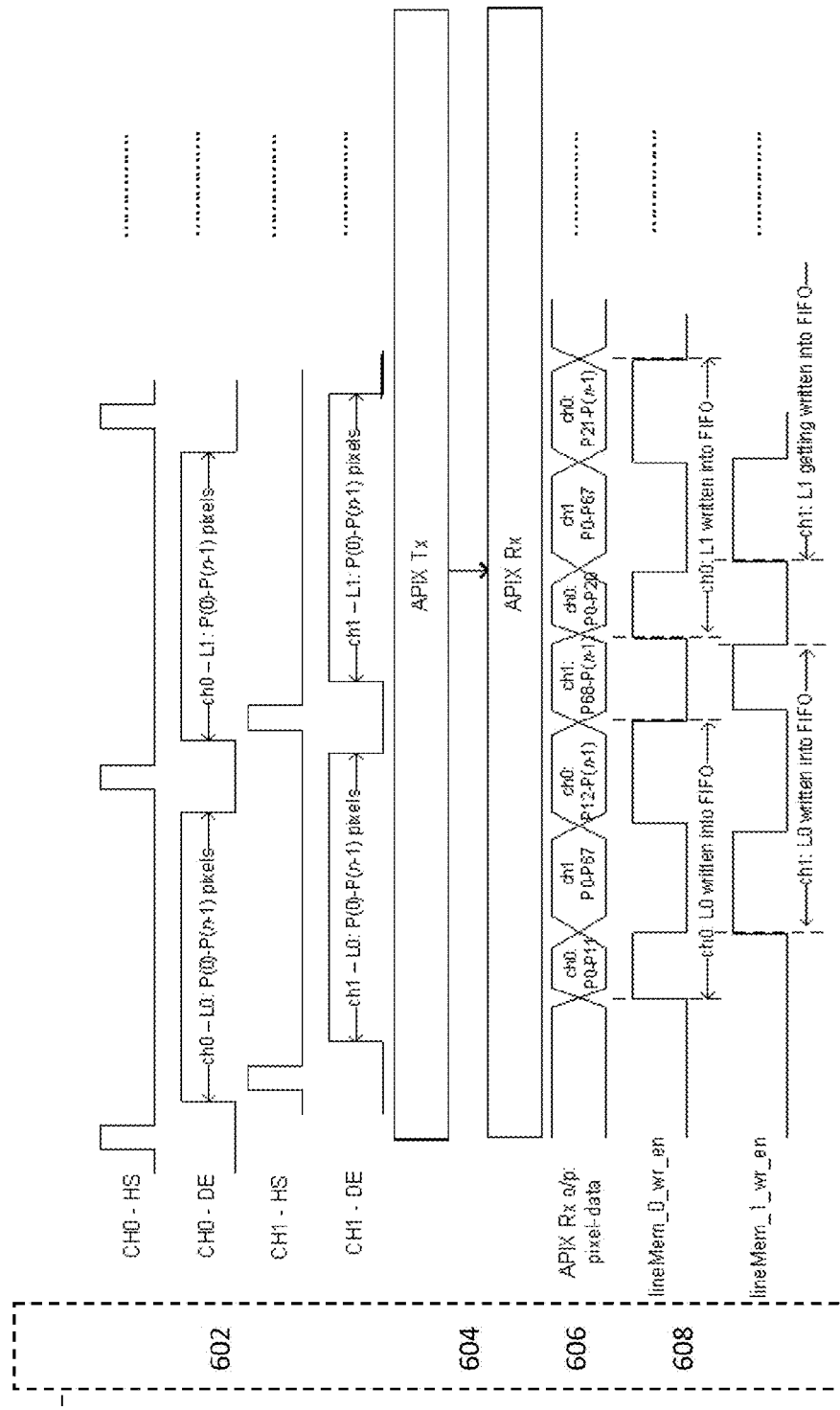
FIGS. 6A-6B provide diagrams illustrating transport of two video streams through the APIX and the CSI interfaces, according to an embodiment of the present invention.
Figure 6B:
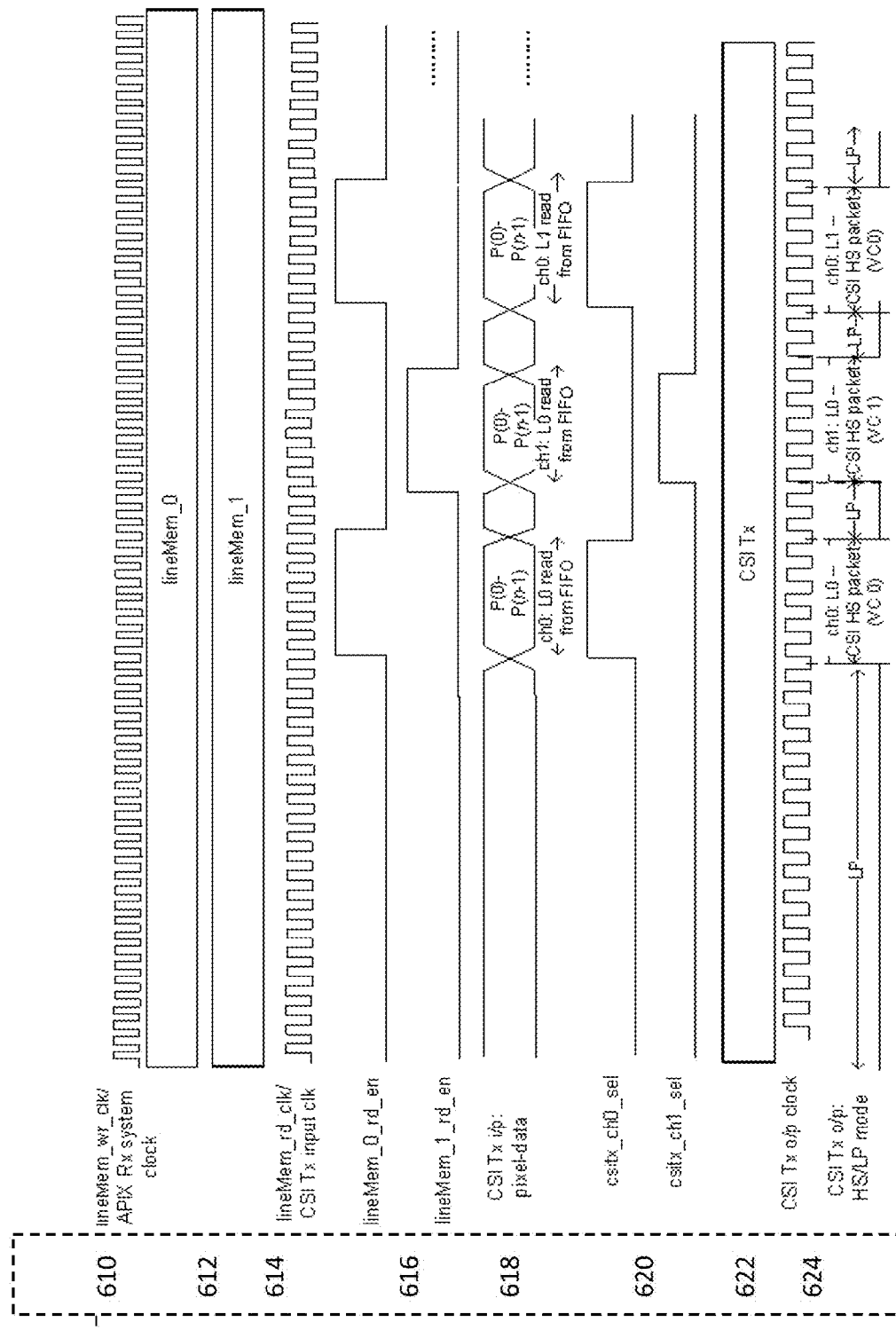

FIGS. 6A-6B provide diagrams illustrating transport of two video streams through the APIX and the CSI interfaces, according to an embodiment of the present invention. While the steps illustrated in FIGS. 6A-6B are described with reference to elements of the systems 500 and 100, a person skilled in the art will recognize that any other suitable system could be used to implement these steps. Similar to FIGS. 2 and 3, the exemplary illustration of FIGS. 6A-6B is shown for transporting video streams, such as e.g. the video streams 106-0 and 106-1 shown in FIG. 1, e.g. from the UIP 102 to the HU 104.

Step 602 of FIG. 6A illustrates the synchronization signals HS and data enable signals DE for the two sources of video data, the two sources designated as channels ("CH") 0 and 1. Discussions provided above for step 202 of FIG. 2 are applicable to step 602 and, therefore, in the interests of brevity, are not repeated here.

Step 604 of FIG. 6A illustrates the signals of step 602 being provided from the data sources to the transmitter of the APIX® interface (e.g. the APIX Tx 114 shown in FIG. 1) and the APIX Tx transporting the signals to the APIX Rx. Discussions provided above for step 204 of FIG. 2 are applicable to step 604 and, therefore, are not repeated here.

Step 606 of FIG. 6A illustrates the pixel data of the two data streams CH0 and CH1 at the APIX Rx 504 comprising Packets 1-7, etc., as described above with reference to step 206 (the description of Packets 1-7 of step 606 is, therefore, not repeated here), received in an interleaved and interrupted (burst-mode) manner as the signal 502 to APIX Rx 504.

Step 608 of FIG. 6A illustrates "write enable" signals, shown as "lineMem_0_wr_en" and "lineMem_1_wr_en", being generated by the APIX Rx 504 for writing the data corresponding to the two video channels CH0 and CH1, respectively, into their respective buffers 508-0 and 508-1. As shown in FIG. 6A, the write enable signal "lineMem_0_wr_en" enables writing of the pixel data from Packets 1, 3, 5, 7, etc. to the buffer 508-0, where the pixel data from the Packets 1 and 3 together form a complete line 0 (i.e., all n pixels P(0)-P(n−1)) of pixel data for CH0, while the pixel data from the Packets 5 and 7 together form a complete line 1 of pixel data for CH0, etc. Similarly, the write enable signal "lineMem_1_wr_en" enables writing of the pixel data from Packets 2, 4, 6, etc. to the buffer 508-1, where the pixel data from the Packets 2 and 4 together form a complete line 0 of pixel data for CH1, etc.

Steps shown in FIG. 6A continue with the steps shown in FIG. 6B.

Step 610 of FIG. 6B illustrates an APIX® system clock, which, as described above, is a fixed frequency clock of 187.5 MHz, on which the output of the APIX Rx shown in step 606 is clocked. In an embodiment, the APIX® system clock may also be used for the write-side clock for writing into the buffers 508 as described in step 608.

Step 612 of FIG. 6B illustrates the buffers 508-0 and 508-1, in the exemplary illustration of FIG. 6B shown as line memories lineMem_0 and lineMem_1, respectively, for storing video data from the sources Ch0 and CH1, respectively.

Step 614 of FIG. 6B illustrates the read-side clock for the line memories of step 612 (i.e., the clock signal shown as signal 512/514 in FIG. 5), which, as described above with reference to the clock signal 512/514 is a multiple of a fixed frequency clock. Discussions provided above for the fixed frequency clock 512/514 shown in FIG. 5 are applicable to the clock of step 614 and, therefore, are not repeated here. The clock shown in step 614 is also the clock on which the input data to the CSI Tx will be clocked. Thus, the clock shown in step 614 is the clock that the control logic 510 is configured to use to read (i.e. transfer) data from the buffers 508-0 and 508-1 to the multiplexer 524 (i.e., signals 516-0 and 516-1) and also the clock that the control logic 510 is configured to use to generate the input signal 526 provided from the multiplexer 524 to the CSI Tx 518.

Step 616 of FIG. 6B illustrates "read enable" signals, shown as "lineMem_0_rd_en" and "lineMem_1_rd_en", being generated by the control logic 510 for reading the data stored in the buffers 508-0 and 508-1, respectively, to the multiplexer 524 (i.e. for transferring the data stored in the buffers 508-0 and 508-1 into the multiplexer 524). The control logic 510 may provide such signals to the buffers 508 via the communication path 528.

The control logic 510 is configured to issue "read enable" signals to read data for a particular channel so that, during the duration of the read enable signal(s) for that channel, pixel data corresponding to a complete line could be transferred from the respective buffer (i.e., the buffer 508 corresponding to this particular channel) to the multiplexer 524. In an embodiment, the control logic 510 is able to do so because the control logic 510 is configured to obtain (e.g. get access to or receive, possibly upon a request) from the APIX Rx 504 data indicative of the timing of the horizontal sync signal for that channel. For example, the APIX Rx 504 may be configured to forward the HS signals for all of the channels or provide any kind of indication that such HS signals have been detected at the APIX Rx 504 to the control logic 510 (via a communication path between the APIX Rx 504 and the control logic 510 not explicitly shown in FIG. 5).

In a similar manner, the control logic 510 is also configured to provide an indication to the multiplexer 524 as to when the multiplexer 524 has received pixel data corresponding to a complete line for a particular channel. Such an indication could be provided via the communication path 530 between the control logic 510 and the multiplexer 524. The multiplexer 524 is then able to collate all data corresponding to a particular complete line of a particular channel into a separate portion to be multiplexed into the signal 526 provided to as the input to the CSI Tx 518. This is shown in step 618 of FIG. 6B illustrating the signal 526 comprising multiplexed portions analogous to the input packets 1, 2, and 3 described in step 304 of FIG. 3. Thus, in step 618, all active video data corresponding to a particular complete line of one channel is collated together by the multiplexer 524, and provided, multiplexed with all active video data corresponding to a particular complete line of another channel, as an input to the CSI Tx 518, as required by the CSI protocol.

In one embodiment, the data read from the buffers 508 in turn may be used by a state machine within the CSI Tx 518 in order to determine when the read data is to be inserted into CSI packets and transmitted over the CSI link. In this manner, a "handshake" may be performed between the buffers 508 and the CSI Tx 518.

Alternatively, the control logic 510 may be configured to provide an indication to the CSI Tx 518, e.g. via the communication path 532, as to when the CSI Tx 518 receives active data corresponding to which channel. Such an indication may be provided in a form of "channel select" signals, illustrated in step 620 as signals "csitx_ch0_sel" and "csitx_ch1_sel" for selecting CH0 and CH1, respectively. The channel select signals of step 620, generated by the control logic 510, are analogous to those described in step 306 and, therefore, their description is not repeated here.

Step 622 of FIG. 6B, illustrates the MIPI CSI Tx 518, i.e. a single CSI Tx, being required for transmitting data corresponding to both video sources, CH0 and CH1, in contrast to the prior art approach described in association with FIG. 4 where two CSI Tx(s) were required.

Step 624 of FIG. 6B illustrates the output data of the CSI Tx (indicated as "CSI Tx o/p: HS/LP mode"), similar to that described in step 310 of FIG. 3. The CSI Tx 518 encodes the incoming video data into CSI packets and assigns VC numbers 0 and 1 for CH0 and CH1, respectively. When triggered by a channel select signal of the control logic 510, as shown in step 620, and for the duration of the channel select signal, the CSI Tx enters its HS mode to transmit a packet corresponding to active video data in a complete line of a particular video stream. During the time intervals between the transmissions of two such packets (i.e., where there is no channel select signal for any of the channels), the CSI Tx 518 may enter the LP mode. Similar to step 310 of FIG. 3, step 624 of FIG. 6B illustrates that the active data provided in the i/p packet 1 (i.e., active data for the complete line 0 of CH0) is transmitted by the CSI Tx 518 in an o/p packet 1 assigned a VC number VC0, the active data provided in the i/p packet 2 (i.e., active data for the complete line 0 of CH1) is transmitted in an o/p packet 2 assigned a VC number VC1, the active data provided in the i/p packet 3 (i.e., active data for the complete line 1 of CH0) is transmitted in an o/p packet 3 assigned a VC number VC0, and so on.

Unlike the output data of step 310, the output data of step 624 is clocked at the fixed frequency clock 512/514, where the PLL divider ratios could be determined based on the input video format. Because the input clock frequency of steps 614 and 618 is a multiple of a fixed frequency clock, the output clock of step 624 is also limited to its range of frequencies, thereby making it easier to optimize the end user's system with respect to EMI reduction.

As the foregoing illustrates, the prior art approach shown in FIG. 4 was based on re-generating a pixel clock for each of the video streams being transported by the APIX® interface using a PLL. The output from the APIX® Rx, for each video stream, would be written into a corresponding data-buffer, the write clock being the pixel clock generated by the APIX® Rx and the read clock being the re-generated/cleaned up pixel clock generated by the PLL. One disadvantage of this approach is that because the clock used for driving the MIPI CSI Tx input is the pixel clock itself, only one video stream can be transported by a CSI Tx. In order to transport both video streams transported by the APIX® interface, two CSI Tx(s) would be required, resulting in an increase in pin-count. Additionally, this approach would result in a varying MIPI CSI Tx output clock which would make reducing of EMI difficult in the end user system.

In contrast, embodiments of the present invention as described above and shown e.g. in FIGS. 5 and 6A-6B would result in requiring only one CSI Tx transmitting data on a clock derived from a fixed frequency clock such as e.g. an XTAL clock. There are several advantages to implementing such an approach. One advantage is that transporting both video streams received by the APIX® Rx over a single MIPI CSI Tx means reduced pin-count for the bridge ASIC and lower number of printed circuit board ("PCB") traces, resulting in lower Bill of Materials ("BoM"). Another advantage is that the fixed frequency clock frequency that determines the MIPI output serial clock frequency can be tuned by the customer to suit EMI/EMC of their system, in contrast to a varying MIPI output serial clock frequency if re-generating a pixel clock to drive the inputs of the CSI Tx as was done in the prior art. Yet another advantage is that a fast CSI Tx interface for a low resolution could result in power savings, as a result of the CSI Tx remaining in its LP mode for longer.

Variations and Implementations

While embodiments of the present invention were described above with references to exemplary implementations as shown in FIGS. 5 and 6A-6B, a person skilled in the art will realize that the various teachings described above are applicable to a large variety of other implementations. For example, the implementation of the embodiments of the present invention is not limited to two data streams, but could be used for any number N of data streams (N being an integer preferably equal to or greater than 2). Furthermore, while embodiments of the present invention are particularly advantageous for video streams, teachings provided herein equally apply to implementations where the data streams are not necessarily video streams but could contain any data, e.g. at least some (or all) of the streams could comprise audio or multimedia data. Preferably such data streams comprise data organized in units of data, e.g. as video data being organized in lines. Still further, while embodiments described herein are particularly advantageous for providing a bridge between an APIX interface and a CSI Tx, these embodiments apply to implementations where data from any N data streams is to be provided as an input to a single CSI Tx. Moreover, while embodiments described herein were described with a reference of an vehicle infotainment system such as the one illustrated in FIG. 1, the teachings of these embodiments are applicable to any system, not necessarily a system used in a vehicle and/or not necessarily for providing [video] data from a UIP to a HU of a vehicle (but e.g. for providing video data from a UIP to a rear-seat screen of a vehicle), where data from any N data streams is to be provided as an input to a single CSI Tx. Such alternative applications are described in greater detail below.

Thus, a person skilled in the art could easily extend the various embodiments of the present invention as described above to a more general system for combining data of N data streams/channels, N being an integer equal to or greater than two, into a multiplexed data stream for input into a single transmitter of a CSI Tx (518), where each of the N data streams comprised data organized in units of data (e.g. lines, if it's video data). Such a system would utilize N data buffers (508), where each buffer is configured to store data provided via a respective different data stream of N data streams, a control logic (510) configured to control reading of the data stored in each of the N data buffers, and a multiplexer (524) configured to multiplex the data (516-0; 516-1) read from each of the N data buffers into the data stream (526) and provide the data stream (526) as an input to the CSI Tx. Such a control logic would be configured to issue a read-enable signal (616) for each of the N data buffers, the read-enable signal indicating when the data stored in a respective data buffer of the N data buffers is to be transferred into the multiplexer (524) at a multiple of a frequency of a fixed frequency clock (512/514). Such a control logic would also be configured to, in response to receiving an indication when each unit of data of the respective data stream of N data streams begins and ends (such as e.g. horizontal sync signals), control the multiplexer to multiplex the data into the data stream (526) so that each multiplexed portion of the data stream (526) comprises a respective complete unit of data of one of the units of data of the N data streams (i.e., so that each complete unit of data is provided in its' entirety, i.e. in a single unit, to the input of the CSI Tx) and so that all units of data of the N data streams are included into the data stream. Such a control logic would further be configured to control the CSI Tx to enter a high-power mode for transmission of each respective complete unit of data in a separate packet (624).

Embodiments of the present invention are based on a recognition that using a re-generated pixel clock for each of the multiple data streams for driving the input to a CSI Tx, as is done in the prior art system described above, is suboptimal for several reasons. One reason is that, since the clock for driving the input to a CSI Tx is a pixel clock itself, only one data stream can be transported by a single CSI Tx, resulting in the necessity to use N CSI Tx interfaces to transport N data streams, undesirably increasing the pin-count of a CSI Tx. Another reason is that using a re-generated pixel clock for driving the input to the CSI Tx results in a CSI Tx output clock that varies depending on the clock of the source of the data streams, which makes reducing of the EMI in the end user system difficult. Embodiments of the present invention are further based on an insight that employing a control logic that controls reading of data from the respective channel buffers at a multiple of a frequency of a fixed frequency clock improves on both of these problems. Using a fixed frequency clock, i.e. a clock that, unlike the re-generated pixel clock, is not dependent on a pixel clock itself, allows collating all data corresponding to a particular line together so that it is ready to be transmitted in a single CSI packet, as required by the CSI protocol. In addition, using a fixed frequency clock to drive the input to the CSI Tx allows an easier and more effective reduction of the EMI since the possible frequencies to be used for driving the input to a CSI Tx are known ahead of time (i.e., not dependent on a particular source of data and its' pixel clock) and can be accounted for.

In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind).

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions.

In the discussions of the embodiments above, components of a system, such as e.g. clocks, multiplexers, buffers, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

Parts of various systems for providing an input to a CSI Tx can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed signal domain. In some instances, the processor may be configured to carrying out the functions described herein by executing one or more instructions stored on a non-transitory computer readable storage medium.

In one example embodiment, any number of electrical circuits of the FIGS. 1 and 5 may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGS. 1 and 5 may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the functionalities of providing an input to a CSI Tx may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGS. 1 and 5 may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGS. 1 and 5 and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to providing input to a CSI Tx illustrate only some of the possible functions that may be executed by, or within, systems illustrated in the FIGS. 1 and 5. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Note that all optional features of the apparatus described above may also be implemented with respect to the method or process described herein and specifics in the examples may be used anywhere in one or more embodiments.

What is claimed is:

1. A system for providing an input data stream to a transmitter of a Camera Serial Interface (CSI Tx), wherein:
   the input data stream comprises data of at least a first data stream and a second data stream,
   the first data stream comprises data organized in first units of data,
   the second data stream comprises data organized in second units of data,
   the data of the first data stream is to be written into a first buffer, and
   the data of the second data stream is to be written into a second data buffer,
the system comprising:
   a multiplexer; and
   a control logic configured to:
      issue a first read-enable signal to transfer at least a part of the data stored in the first buffer to the multiplexer at a predefined multiple of a frequency of a fixed frequency clock,
      issue a second read-enable signal to transfer at least a part of the data stored in the second buffer to the multiplexer at the predefined multiple of the frequency of the fixed frequency clock,
      control the multiplexer to combine all data transferred from the first buffer and corresponding to a complete unit of the first units of data into a first portion,
      control the multiplexer to combine all data transferred from the second buffer and corresponding to a complete unit of the second units of data into a second portion,
      control the multiplexer to multiplex the first portion and the second portion into the input data stream,
      provide the input data stream to the CSI Tx.

2. The system according to claim 1, wherein:
each of the first and second data streams is received by the system as an output of an Automotive Pixel Link (APIX) interface,
the first data stream comprises a first video stream and the second data stream comprises a second video stream,
each unit of the first units of data comprises a complete line comprising a first number of pixels and each unit of the second units of data comprises a complete line comprising a second number of pixels,
the control logic is further configured to receive indications from the APIX interface when each complete line of each of the first and second video streams begins and ends, and
the control logic is further configured to control the CSI Tx to enter a high-speed (HS) mode to transmit each complete line of each of the first and second video streams in a separate packet.

3. The system according to claim 2, wherein the indications received from the APIX interface comprise horizontal sync signals.

4. The system according to claim 1, wherein the control logic is further configured to:
provide to the CSI Tx an identification of the complete unit of the first units of data included in the first portion and an indication that the first portion contains data of the first data stream, and
provide to the CSI Tx an identification of the complete unit of the second units of data included in the second portion and an indication that the second portion contains data of the second data stream.

5. The system according to claim 1, wherein:
the first data stream comprises a first video stream and the second data stream comprises a second video stream,
each unit of the first units of data comprises a complete line comprising a first number of pixels and each unit of the second units of data comprises a complete line comprising a second number of pixels,
the system further comprises the first buffer and the second buffer,
the first buffer comprises a line buffer for storing at least a portion of the complete line comprising the first number of pixels and the second buffer comprises a line buffer for storing at least a portion of the complete line comprising the second number of pixels.

6. The system according to claim 1, wherein the system further comprises the fixed frequency clock.

7. The system according to claim 6, wherein the system further comprises a phase locked loop coupled to the output of the fixed frequency clock.

8. The system according to claim 1, wherein the fixed frequency clock comprises an XTAL clock.

9. The system according to claim 1, wherein the multiple of the frequency of the fixed frequency clock is selected based on minimum frequency requirements derived from the sum of data rates of the first and second data streams.

10. The system according to claim 1, wherein the system is implemented in an application specific integrated circuit (ASIC).

11. The system according to claim 1, wherein at least a part of the system is implemented in a programmable hardware.

12. A method for providing an input data stream to a transmitter of a Camera Serial Interface (CSI Tx), wherein:
the input data stream comprises data of at least a first data stream and a second data stream,
the first data stream comprises data organized in first units of data,
the second data stream comprises data organized in second units of data,
the data of the first data stream is to be written into a first buffer, and
the data of the second data stream is to be written into a second data buffer,
the method comprising:
issuing a first read-enable signal to transfer at least a part of the data stored in the first buffer to a multiplexer at a predefined multiple of a frequency of a fixed frequency clock,
issuing a second read-enable signal to transfer at least a part of the stored in the second buffer to the multiplexer at the predefined multiple of the frequency of the fixed frequency clock,
controlling the multiplexer to combine all data transferred from the first buffer and corresponding to a complete unit of the first units of data into a first portion,
controlling the multiplexer to combine all data transferred from the second buffer and corresponding to a complete unit of the second units of data into a second portion,
controlling the multiplexer to multiplex the first portion and the second portion into the input data stream,
providing the input data stream to the CSI Tx.

13. The method according to claim 12, wherein:
each of the first and second data streams is received by the system as an output of an Automotive Pixel Link (APIX) interface,
the first data stream comprises a first video stream and the second data stream comprises a second video stream,
each unit of the first units of data comprises a complete line comprising a first number of pixels,
each unit of the second units of data comprises a complete line comprising a second number of pixels, and
the method further comprises:
receiving indications from the APIX interface when each complete line of each of the first and second video streams begins and ends, and
controlling the CSI Tx to enter a high-speed mode to transmit each complete line of each of the first and second video streams in a separate packet.

14. The method according to claim 13, wherein the indications received from the APIX interface comprise horizontal sync signals.

15. The method according to claim 12, further comprising:
providing to the CSI Tx an identification of the complete unit of the first units of data included in the first portion and an indication that the first portion contains data of the first data stream, and
providing to the CSI Tx an identification of the complete unit of the second units of data included in the second portion and an indication that the second portion contains data of the second data stream.

16. The method according to claim 12, wherein the fixed frequency clock comprises an XTAL clock.

17. The method according to claim 12, wherein the multiple of the frequency of the fixed frequency clock is selected based on minimum frequency requirements derived from the sum of data rates of the first and second data streams.

18. The method according to claim 12, further comprising:
obtaining information indicative of a data rate of the first data streams and of a data rate of the second data stream, and
selecting the multiple of the frequency of the fixed frequency clock based on minimum frequency requirements derived from a sum of the data rate of the first data stream and the data rate of the second data stream.

19. A non-transitory computer readable storage medium storing software code portions configured for, when executed on a processor, carrying out a method for providing an input data stream to a transmitter of a Camera Serial Interface (CSI Tx) wherein:
the input data stream comprises data of at least a first data stream and a second data stream,
the first data stream comprises data organized in first units of data,
the second data stream comprises data organized in second units of data,
the data of the first data stream is to be written into a first buffer, and
the data of the second data stream is to be written into a second data buffer,
the method comprising:
issuing a first read-enable signal to transfer at least a part of the data stored in the first buffer to a multiplexer at a predefined multiple of a frequency of a fixed frequency clock,
issuing a second read-enable signal to transfer at least a part of the stored in the second buffer to the multiplexer at the predefined multiple of the frequency of the fixed frequency clock,
controlling the multiplexer to combine all data transferred from the first buffer and corresponding to a complete unit of the first units of data into a first portion,
controlling the multiplexer to combine all data transferred from the second buffer and corresponding to a complete unit of the second units of data into a second portion,
controlling the multiplexer to multiplex the first portion and the second portion into the input data stream,
providing the input data stream to the CSI Tx.

20. The non-transitory computer readable storage medium according to claim 19, wherein:
each of the first and second data streams is received by the system as an output of an Automotive Pixel Link (APIX) interface,
the first data stream comprises a first video stream and the second data stream comprises a second video stream,
each unit of the first units of data comprises a complete line comprising a first number of pixels,
each unit of the second units of data comprises a complete line comprising a second number of pixels, and
the method further comprises:
receiving indications from the APIX interface when each complete line of each of the first and second video streams begins and ends, and
controlling the CSI Tx to enter a high-speed mode to transmit each complete line of each of the first and second video streams in a separate packet.

* * * * *